Figure 2:
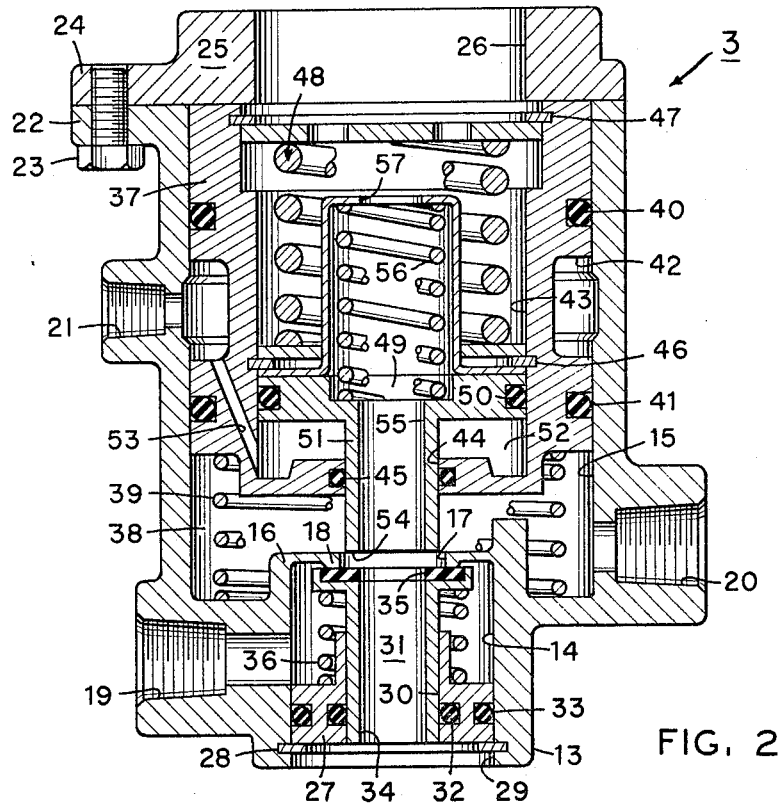

Nov. 29, 1966 R. C. BUELER 3,288,539
CONTROL VALVE
Original Filed Sept. 10, 1964 2 Sheets-Sheet 1

INVENTOR
RICHARD C. BUELER
BY
Joseph E. Papin

INVENTOR
RICHARD C. BUELER
BY
*Joseph E. Papio*

United States Patent Office 3,288,539
Patented Nov. 29, 1966

3,288,539
CONTROL VALVE
Richard C. Bueler, Glendale, Mo., assignor to Wagner Electric Corporation, St. Louis, Mo., a corporation of Delaware
Continuation of application Ser. No. 395,433, Sept. 10, 1964. This application Mar. 28, 1966, Ser. No. 538,104
21 Claims. (Cl. 303—13)

This application is a continuation of application Serial No. 395,433, filed September 10, 1964, and now abandoned.

This invention relates to fluid pressure systems and in particular to control valves therefor having emergency means therein for automatically actuating said systems.

In past fluid pressure systems, particularly those related to vehicle braking, various emergency control devices have been employed to effect emergency braking of the vehicle in the event of malfunction of said systems effecting loss of fluid pressure therein, and the usual emergency control means were incorporated in said fluid pressure systems in the form of separate independent valves, such as the well-known emergency valve or the relay-emergency valve. One of the undesirable features of the past systems was that a separate valve was compatibly employed in said systems along with the other necessary valving therein to effect the emergency function, and, of course, it is apparent that such separate valving manifestly increased the initial cost of said systems as well as the maintenance or cost of upkeep therefor. Another undesirable or disadvantageous feature of the use of a separate emergency valve in a fluid pressure system was particularly evident in the past tractor-trailer braking systems wherein the emergency valve when actuated due to low pressure in said system effected energization of only the trailer brakes; however, it would have been more desirable to have also effected energization of the tractor brakes in order to obtain maximum braking effort for such tractor-trailer braking systems under such low pressure or emergency conditions. In conjunction with the aforementioned undesirable feature of the past tractor-trailer braking systems, another undesirable feature was the inability of the operator to actuate the tractor brakes in the event the treadle or treadle linkage to the system application valve was lost, disengaged, broken, or for some other reason became inoperable to effect actuation of said application valve. Still another undesirable or disadvantageous feature in the past tractor-trailer fluid pressure systems utilizing a separate emergency valve was that premature tractor movement was not obviated until sufficient operating pressure was attained in the system pressure reservoir, such as encountered in moving a tractor which had been parked for a period of time.

The object of the present invention is to provide a novel fluid pressure system and novel control valve means therefor which obviates the aforementioned undesirable or disadvantageous features, and this and other objects and advantageous features of the present invention will become apparent hereinafter.

Briefly, the invention embodies a fluid pressure system having a pair of fluid pressure sources and a fluid pressure responsive motor and also control means for normally effecting the application of fluid pressure from one of said sources to said motor including means responsive to fluid pressure in the other of said sources less than a predetermined amount to also effect the application of fluid pressure from said one source to said motor.

Figure 1:
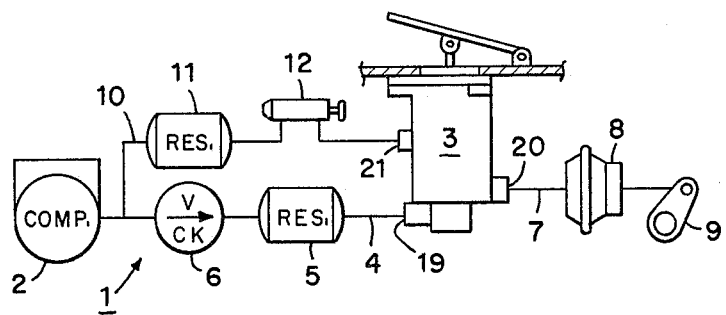
Figures 3, 4:
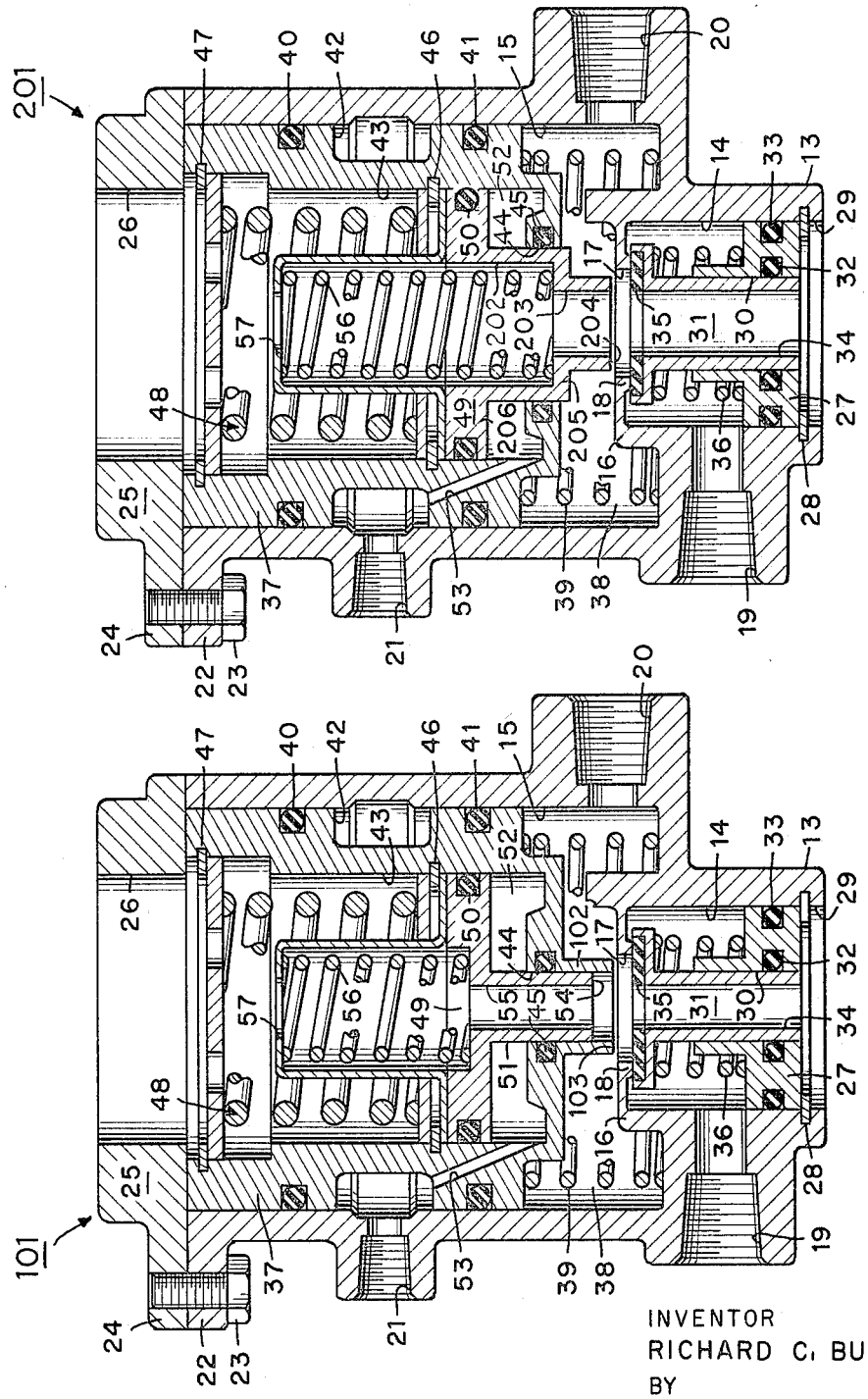

In the drawing which illustrates embodiments of the invention,

FIG. 1 is a diagrammatic view of a fluid pressure system having control valve means therein embodying the present invention, FIG. 2 is a greatly enlarged cross-sectional view of the control valve means of FIG. 1, FIG. 3 is a cross-sectional view of another control valve means embodying the present invention for use in the fluid pressure system of FIG. 1, and FIG. 4 is another cross-sectional view of valve control means embodying the present invention for use in the fluid pressure system of FIG. 1.

Referring now to the drawings in detail and in particular to FIG. 1, a fluid pressure system 1 is shown having fluid pressure generating means or compressor 2 connected with the inlet port of a control or application valve 3 by a conduit 4 having a reservoir 5 interposed therein, and a check valve 6 is provided in said conduit to provide uni-directional pressure fluid flow from said compressor to said reservoir. Another conduit 7 is connected between the outlet port of the control valve 3 and a fluid pressure responsive motor or brake chamber 8 which is operatively connected with linkage means, such as slack adjustor 9, for controlling the energization of a friction device (not shown). Another conduit 10 has one end connected with the emergency or control port of the control valve 3 and the other end thereof intersecting with the conduit 4 between the compressor 2 and check valve 6, and another reservoir 11 is interposed in the conduit 10. To complete the description of the system 1, a push-pull hand valve 12 of the type well known in the art is interposed in the conduit 10 between the reservoir 11 and the control valve 3, said push-pull valve 12 being manually operable between a venting position which interrupts pressure fluid communication between the reservoir 11 and the emergency port 21 of said control valve and exhausts said emergency port to the atmosphere and a charging position connecting said emergency port in pressure fluid communication with the reservoir 11.

The control valve 3, FIG. 2, is provided with a housing 13 having a bore 14 therein, which forms an inlet chamber, and a counterbore 15 in axial alignment with said bore. A radially extending wall 16 is integrally formed with the housing 13 between the bore 14 and counterbore 15, and a connecting passage 17 extends through said wall between said bore and counterbore, said wall having a valve seat 18 thereon in circumscribing relation with said connecting passage. Inlet and outlet ports 19 and 20 which respectively receive conduits 4 and 7, as previously mentioned, are provided in the housing 13 connecting with the bore 14 and counterbore 15, respectively, and a control or emergency port 21 which receives the conduit 10, as previously mentioned, is also provided in said housing connecting with the counterbore 15 adjacent the midportion thereof. A plurality of mounting flanges 22 are provided adjacent to the upper end of the housing 13 and are fixedly connected by suitable means, such as studs 23, with like mounting flanges 24 provided on a closure member 25 for the upper end of the counterbore 15, said closure member having a guide opening 26 therethrough to receive the force transmitting linkage of an operator controlled lever (not shown).

A valve guide member 27 is positioned in the bore 14 against displacement by a snap ring and groove assembly 28 provided adjacent to the lower end of said bore, said lower end of said bore forming an exhaust port 29. The valve guide member 27 is provided with an axial valve bore 30 in which a valve element 31 is slidably received, and seals 32, 33 are carried in said valve guide member in sealing engagement with said valve element and the housing bore 14, respectively. The valve element 31 is provided with an axial exhaust passage 34 therethrough, and an annular resilient seal or disc 35 is provided on the upper end of said valve element in circumscribing relation with said exhaust passage. A valve spring 36 biased between the valve guide member 27 and the valve element 31 normally urges the valve element seal 35 into sealing engagement with the valve seat 18 provided on the housing wall 16 to normally interrupt pressure fluid communication through the connecting passage 17 between the inlet and outlet ports 19, 20 while establishing pressure fluid communication between said outlet port and the exhaust port 29 through said connecting passage and the valve element exhaust opening 34.

An application member or reaction piston 37 is slidably received in the counterbore 15 defining therein with the housing wall 16 an outlet chamber 38 connected in open pressure fluid communication with the outlet port 20 at all times, and a return spring 39 is positioned in said outlet chamber between said reaction piston and said housing wall normally urging the upper end of said reaction piston toward abutting engagement with the counterbore closure member 25. Spaced seals 40, 41 are provided in the peripheral portion of the reaction piston 37 in sealing engagement with the counterbore 15, and a peripheral groove 42 is also provided in said reaction piston between said seals in open pressure fluid communication with the emergency port 21 at all times. The reaction piston 37 is also provided with stepped bores 43, 44 therethrough, and a seal 45 is disposed in said stepped bore 44. Snap ring and groove assemblies 46, 47 are respectively provided adjacent the mid-portion and upper end of the stepped bore 43, and a pre-compressed metering spring and retainer assembly 48 is slidably contained within said stepped bore in abutting engagement with the snap rings 46, 47. An emergency or control piston 49 is slidably received in the stepped bore 43 having a peripheral seal 50 in sealing engagement with said stepped bore, and said emergency piston is provided with an integral extension 51 slidably received in the stepped bore 44 in sealing engagement with the seal 45 and having a lower or free end extending into the outlet chamber 38. An expansible control or emergency chamber 52 is defined in the stepped bore 43 by the emergency piston and extension 49 and 51, and a passage 53 in the reaction piston 37 connects said emergency chamber in open pressure fluid communication with the reaction piston peripheral groove 42 at all times. A valve seat 54 is provided on the lower or free end of the emergency piston extension 51 for engagement with the valve element 31, and an auxiliary exhaust passage 55 extends coaxially through said valve seat and said extension. To complete the description of the control valve 3, an emergency spring 56 has one engaged with the upper end of the emergency piston 49 and the other end thereof engaged with a thimble or cup-shaped retainer 57 to urge said retainer into displacement preventing engagement with the snap ring 46.

Under normal operating conditions with the hand valve 12 in the charging position thereof to effect open pressure fluid communication between the reservoir 11 and the emergency port 21 of the control valve 3, fluid pressure generated by the compressor 2 flows through the conduits 4 and 10, the reservoir 11, and the push-pull valve 12 into the emergency port 21 of the control valve 3 and therefrom through the peripheral groove 42 and passage 53 of the reaction piston 37 into the emergency chamber 52. The fluid pressure so established in the emergency chamber 52 acts on the effective area of the emergency piston 49 therein to establish an emergency force acting against the compressive force of the emergency spring 56 to move said emergency piston upwardly in the reaction piston counterbore 43 to its inoperative position in abutting engagement with the spring retainer 57 and snap ring 46. The fluid pressure generated by the compressor 2 also flows through the conduit 4, the uni-directional valve 6 and the reservoir 5 into the inlet port 19 of the control valve 3 and therefrom to the inlet chamber 14. From the foregoing it is apparent that the reservoir 5 is a protected reservoir since the uni-directional valve 6 protects said reservoir against loss of fluid pressure therefrom due to a malfunctioning compressor and/or leaks in the system 1 ahead of the reservoir 5. With the fluid pressure so established in the reservoirs 5, 11 and the emergency chamber 52 of the control valve 3, the component parts of the control valve are now positioned as shown in the drawings.

If the operator desires to effect a braking application, a manually-applied force on the metering spring and retainer assembly 48 moves the reaction piston 37 downwardly against the compressive force of the return spring 39 to engage the valve seat 54 on the emergency piston extension 51 with the valve element 31 to close the valve element exhaust opening 34 and the emergency piston exhaust passage 55 and interrupt pressure fluid communication between the outlet and exhaust ports 20 and 29. Further downward movement of the reaction piston 37 serves to disengage the valve element 31 from the valve seat 18 on the housing wall 16 to open the connecting passage 17 and establish pressure fluid communication between the inlet and outlet ports 19 and 20. In this manner, pressure fluid flows from the reservoir 5 through the conduit 4, the inlet port and chamber 19 and 14, the connecting passage 17, the outlet chamber and port 38 and 20, and through the conduit 7 to actuate the brake chamber 8 which, in turn, rotates the slack adjustor 9 to energize the wheel brake assembly associated therewith (not shown).

When the reaction force of the fluid pressure in the outlet chamber 38 acting on the effective area of the reaction piston 37 therein is substantially equal to the applied force, said reaction piston is moved upwardly against the compressive force of the metering spring and retainer assembly 48 wherein the valve element 31 is positioned in lapped engagement with the valve seat 18, and the valve seat 54 on the emergency piston extension 51 is positioned in lapped engagement with said valve element. If greater braking effort is desired, the manually applied force is increased, and the component parts of the control valve 3 function in the same manner as previously described to again move said component parts to their lapped positions.

When the desired braking effort is attained, the manually applied force is removed from the reaction piston 37 wherein the compressive force of the return spring 39 and the reactive force on said reaction piston serve to move said reaction piston upwardly toward its original or inoperative position, and the valve spring 36 returns the valve element 31 into sealing engagement with the valve seat 18. Initially, this upward movement sealably re-engages the valve element 31 with the valve seat 18 to again interrupt pressure fluid communication between the inlet and outlet ports 19 and 20, and further upward movement of the reaction piston 37 disengages the valve seat 54 on the emergency piston extension 51 from said valve element to re-establish pressure fluid communication between the outlet port and exhaust ports 20 and 29 to effect de-energization of the wheel brake assembly associated therewith by exhausting the established fluid pressure to the atmosphere from the brake chamber 8 through the conduit 7, the outlet port and chamber 20 and 38, the connecting passage 17, the valve element exhaust passage 34, and the exhaust port 29.

Under emergency conditions when the fluid pressure in the reservoir 11 is reduced or lost due to a malfunctioning compressor and/or leaks in the system 1 or the like, the fluid pressure in the emergency chamber 52 is correspondingly reduced along with the emergency force on the emergency piston 49. When the fluid pressure in the emergency chamber 52 is so reduced to a predetermined minimum value, the compressive force of the emergency spring 56 overcomes the opposing, reduced emergency force and serves to move the emergency piston 49 downwardly in the reaction piston bore 43 relative to the reaction piston 37 to engage the valve seat 54 on the emergency piston extension 51 with the valve element 31 to effect automatic actuation of said valve element under emergency conditions. This emergency actuation of the valve element 31 by the emergency piston 49 initially interrupts pressure fluid communication between the outlet and exhaust ports 20 and 29 and thereafter establishes pressure fluid communication between the inlet and outlet ports 19 and 20, as described hereinbefore, to effect emergency energization of the wheel brake assembly (not shown).

In the event that the operator treadle or treadle linkage (not shown) is lost, broken, disengaged from the control valve 3, or for some other reason becomes inoperable for transmitting the applied force to the reaction piston 37, the operator can manually actuate the system 1 to effect or simulate emergency conditions by manually moving the push-pull valve 12 to the venting position thereof to interrupt pressure fluid communication between the reservoir 11 and the emergency port 21 of the control valve 3 and exhaust said emergency port to the atmosphere. When the system 1 is manually actuated in this manner to effect an emergency condition, fluid pressure in the emergency chamber 52 is vented to the atmosphere through the reaction piston passage 53, the peripheral groove 42, the emergency port 21 and the conduit 10 to the push-pull valve 12. Exhaustion of the fluid pressure from the emergency chamber 52 eliminates the emergency force on the emergency piston 49, thereby permitting the opposing compressive force of the emergency spring 56 to move said emergency piston relative to the reaction piston 37 and effect automatic actuation of the valve element 31, as described hereinbefore, along with the resulting energization of the wheel brake assembly (not shown).

Referring now to FIG. 3, a control valve 101 is shown having substantially the same component parts and functioning in the system 1 in substantially the same manner as the previously described control valve 3 with the following exceptions.

The control valve 101 is provided with an extension 102 on the reaction piston 37 having a valve seat 103 on the lower or free end thereof for engagement with the valve element 31, and the stepped bore 44 of said reaction piston extends coaxially through the reaction piston extension 102 and valve seat 103. The emergency piston extension 51 is slidably received in the stepped bore 44 in sealing engagement with the seal 45, and the valve seat 54 on the free end thereof is adapted for engagement with the valve element 31 only under emergency conditions.

Under normal operating conditions with the push-pull valve 12 in the charging position thereof to effect pressure fluid communication between the reservoir 11 and the emergency chamber 52 of the control valve 101, the component parts of the control valve 101 are positioned as shown in the drawing. An applied force on the reaction piston 37 moves said reaction piston downwardly to engage the valve seat 103 of the reaction piston extension 102 with the valve element 31 to effect actuation of said valve element and the resulting energization and de-energization of the wheel brake assembly (not shown), as previously described hereinbefore.

Under emergency conditions when the fluid pressure in the reservoir 11 is reduced or lost due to a malfunctioning compressor and/or leaks in the system 1 or the like, the fluid pressure in the emergency chamber 52 is correspondingly reduced, which effects a reduction of the emergency force on the emergency piston 49. When the fluid pressure in the emergency chamber 52 is so reduced to a predetermined minimum value, the compressive force of the emergency spring 56 overcomes the opposing, reduced emergency force and serves to move the emergency piston 49 downwardly in the reaction piston bore 43 relative to the reaction piston 37 to engage the valve seat 54 on the emergency piston extension 51 with the valve element 31 to effect automatic actuation of said valve element under emergency conditions, as previously described hereinbefore. Of course, when the system 1 is manually actuated to effect an emergency condition, the emergency piston 49 functions in the same manner to effect automatic actuation of the valve element 31.

Referring now to FIG. 4, a control valve 201 is shown having substantially the same component parts and functioning in the system 1 in substantially the same manner as the previously described control valves 3 and 101 with the following exceptions.

The control valve 201 is provided with stepped extensions 202, 203 on the emergency piston 49 having a valve seat 204 on the lower or free end of the stepped extension 203. The emergency piston extension 202 is slidable in the reaction piston bore 44 in sealing engagement with the seal 45, and the auxiliary exhaust passage 51 extends coaxially through the stepped extensions 202, 203 and the valve seat. A shoulder 205 is defined between the stepped extensions 202, 203 having an effective area responsive to fluid pressure in the outlet chamber 38, and the effective area of the shoulder 205 is in a predetermined ratio with the effective area of the shoulder 206 on the emergency piston 49 which is responsive to the fluid pressure in the emergency chamber 52.

Under normal operating conditions with the push-pull valve 12 in the charging position thereof to effect pressure fluid communication between the reservoir 11 and the emergency chamber 52 of the control valve 201, the component parts of the control valve 201 are positioned as shown in the drawing. An applied force on the reaction piston 37 moves said reaction piston downwardly to engage the valve seat 204 on the emergency piston extension 203 with the valve element 31 to effect actuation of said valve element and the resulting energization and de-energization of the wheel brake assembly (not shown), as previously described hereinabove.

Under emergency conditions when the fluid pressure in the reservoir 11 is reduced or lost due to a malfunctioning compressor and/or leaks in the system 1 or the like, the fluid pressure in the emergency chamber 52 is correspondingly reduced, and since the emergency force on the emergency piston 49 in opposition to the emergency spring 56 is created by the fluid pressure in said emergency chamber acting on the effective area of the shoulder 206, said emergency force is also correspondingly reduced. When the fluid pressure in the emergency chamber 52 is so reduced to a predetermined minimum value, the compressive force of the emergency spring 56 overcomes the opposing reduced emergency force and serves to move the emergency piston 49 downwardly in the reaction piston bore 43 relative to the reaction piston 37 to engage the valve seat 204 of the emergency piston extension 203 with the valve element 31 to effect automatic actuation of said valve element under emergency conditions to interrupt pressure fluid communication between the outlet and exhaust ports 20 and 29 and establish pressure fluid communication between the inlet and outlet ports 19 and 20, as previously described hereinabove. The fluid pressure so established in the outlet chamber 38 acts on the effective area of the shoulder 205 creating a reaction force which is additive to the emergency force in opposition to the compressive force of the emergency spring 56; therefore, the establishment of the reaction force serves to effect a metered application of fluid pressure from the inlet port 19 to the outlet port 20. In other words, when the output fluid pressure acting on the shoulder 205 attains a magnitude great enough to compensate for the loss of fluid pressure in the emergency chamber, the emergency piston 49 is moved upwardly against the emergency spring 56 to effect lapped engagement between the valve element 31 and the housing valve seat 18 and between said valve element and the valve seat 204. Further loss of fluid pressure from the system 1 and the emergency chamber will, of course, effect further metering of pressure fluid from the inlet port 19 to the outlet port 20 to increase the magnitude of the ouput fluid pressure acting on the effective area of shoulder 205 to compensate for said further pressure fluid loss and return the component parts of the control valve 201 to their lapped positions, as described above, under emergency conditions. The metering application of the control valve 201 under emergency conditions provides for smoother or less abrupt energization of the wheel brake assembly (not shown) under emergency conditions. Further, if the system 1 is manually actuated by the operator to effect an emergency condition, the component parts of the control valve 201 will function in the same manner, as described above, to effect a metered application of fluid pressure from the inlet port 19 to the outlet port 20.

From the foregoing it is now apparent that a novel system and novel control valves meeting the objects and advantages set out hereinbefore are provided and that changes or modifications to the precise configurations, shapes or details of the constructions set forth in the disclosure by way of illustration may be made by those skilled in the art without departing from the spirit of the invention as defined by the claims which follow.

The embodiments of the invention in which an exclusive property or privilege is claimed are defined as follows:

1. A control valve comprising a housing, application means movable in said housing and defining with said housing a pressure fluid flow passage therethrough, said application means being movable in response to an applied force toward a position in said flow passage establishing pressure fluid flow therethrough, said application means including an expansible fluid pressure chamber, and resiliently urged means opposing fluid pressure expansion of said chamber, said resiliently urged means being automatically movable toward a position in said flow passage to establish pressure fluid flow therethrough in response to fluid pressure in said chamber less than a predetermined value.

2. The control valve according to claim 1, comprising a reaction area on said resiliently urged means responsive to the established fluid pressure in said flow passage to oppose the automatic movement of said resiliently urged means.

3. The control valve according to claim 1, comprising a pair of additive areas on said resiliently urged means and in said chamber and flow passage, respectively, the established fluid pressure in said flow passage acting on the area therein to establish a force opposing the automatic movement of said resiliently urged means to compensate for the reduction of the additive force of the fluid pressure in said chamber acting on the area therein when the fluid pressure in said chamber is less than the predetermined value.

4. The control valve according to claim 1, wherein said application means also includes a member movable in said housing, said resiliently urged means including another member adapted for relative and concerted movement with said first named member and defining therewith said chamber, said first named and other members being concertedly movable in response to the applied force to establish pressure fluid flow through said flow passage when the fluid pressure in said chamber exceeds the predetermined value, and resilient means effecting the automatic movement of said other member relative to said first named member to establish pressure fluid flow through said flow passage when the fluid pressure in said chamber is less than the predetermined value.

5. The control valve according to claim 4, comprising abutment means engaged between said first named and other members to provide for the concerted movement thereof when the fluid pressure in said chamber exceeds the predetermined value.

6. The control valve according to claim 1, comprising valve means controlling said flow passage, said application means being movable in response to the applied force to engage and move said valve means toward an open position in said flow passage to establish the pressure fluid flow therethrough, said valve means also being engaged and actuated by said resiliently urged means in response to the automatic movement thereof.

7. The control valve according to claim 4, comprising valve means controlling said flow passage, extension means on said first named member for operative engagement with said valve means, said first named member being movable in response to the applied force to engage said extenison means with said valve means and move said valve means toward an open position in said flow passage establishing the pressure fluid flow therethrough.

8. The control valve according to claim 7, wherein said other member includes other extension means movable in said first named extension means for operative engagement with said valve means, said other extension means being moved into engagement with said valve means to effect actuation thereof upon the automatic movement of said other member.

9. The control valve according to claim 4, comprising valve means controlling said flow passage, said other member including extension means movable in said first named member and extending into said flow passage for operative engagement with said valve means, said first named and other members being concertedly movable in response to the applied force to engage said extension means with said valve means and move said valve means toward an open position in said flow passage establishing the pressure fluid flow therethrough, and said extension means also being movable into engagement with said valve means to effect actuation thereof upon the automatic movement of said other member.

10. A control valve comprising a housing having inlet, outlet and control ports therein, a pair of application means concertedly and relatively movable in said housing, valve means controlling pressure fluid communication between said inlet and outlet ports, an expansible fluid pressure chamber defined between said application means, means within said housing including one of said application means defining passage means connecting said chamber in pressure fluid communication with said control port, resilient means urging the other of said application means toward operative engagement with said valve means and opposing fluid pressure expansion of said chamber, said other application means being movable relative to said one application means in response to the force of said resilient means to engage and move said valve means toward a position establishing pressure fluid communication between said inlet and outlet ports when the fluid pressure at said control port is less than a predetermined value, said other application means also being movable relative to said one application means and against said resilient means toward a retracted position when the fluid pressure in said chamber exceeds the predetermined value, and said one and other application means being concertedly movable when said one application means is in the retracted position thereof in response to an applied force to engage one of said one and other application means with said valve means and effect actuation thereof.

11. The control valve according to claim 10, comprising a reaction area on said other application means responsive to the established fluid pressure at said outlet port to oppose the resilient means movement of said other application means.

12. The control valve according to claim 11, comprising another reaction area on said other application means responsive to the fluid pressure at said control port and additive to said first named reaction area, the force of the established fluid pressure at said outlet port acting on said first named reaction area and compensating for the reduction of the additive force of the fluid pressure at said control port acting on said other area when the fluid pressure at said control port is less than the predetermined value.

13. The control valve according to claim 10, comprising means on said one application means for operative engagement with said valve means, the concerted applied force movement of said one and other application means serving to engage said last named means with said valve means and effect actuation thereof.

14. The control valve according to claim 13, wherein said other application means includes other means movable through said last named means for operative engagement with said valve means, said other means being moved into engagement with said valve means to effect actuation thereof upon the resilient means movement of said other application means.

15. The control valve according to claim 10, wherein said other application means includes extension means movable in said one application means and having a free end portion for operative engagement with said valve means, said end portion being moved into engagement with said valve means to effect actuation thereof upon the concerted applied force movement of said one and other application means and upon the resilient means movement of said other application means.

16. The control valve according to claim 10, comprising an inlet chamber in said housing connected with said inlet port, said one and other application means defining with said housing an outlet chamber connected with said outlet port, a connecting passage in said housing between said inlet and outlet chambers, a valve seat on said housing in circumscribing relation with said connecting passage, said valve means being normally urged into engagement with said valve seat to close said connecting passage and interrupt pressure fluid communication between said inlet and outlet ports, the concerted applied force movement of said one and other application means and the resilient means movement of said other application means serving to actuate said valve means toward a position disengaged from said valve seat to open said connecting passage and establish the pressure fluid communication between said inlet and outlet ports, respectively.

17. The control valve according to claim 10, comprising a bore and counterbore in said housing having wall means therebetween, said inlet and outlet ports respectively intersecting with said bore and counterbore, a connecting passage extending through said wall means between said bore and counterbore, a valve seat on said wall means in circumscribing relation with said connecting passage, said valve means being normally urged into engagement with said valve seat closing said connecting passage and being actuated to a position disengaged from said valve seat and opening said connecting passage in response to the concerted applied force movement of said one and other application means and in response to the resilient means movement of said other application means, said one application means being movable in said counterbore between the end thereof opposite said wall means and said outlet port, another bore in said one application means, spaced abutment means in said other bore, said other application means being movable in said other bore between said abutment means, said resilient means including spring means having opposed ends, one of said spring means opposed ends being biased into engagement with said other application means urging said other application means toward one of said abutment means, retainer means in said bore for engagement with said other abutment means, the other of said spring means opposed ends being biased into engagement with said retainer means urging said retainer means into displacement preventing engagement with said other abutment means, said chamber being defined in said bore between said one and other application means, and said passage means including peripheral groove means in said one application means connected in open pressure fluid communication with said control port, and another connecting passage in said one application means having one end intersecting with said groove means and the other end thereof intersecting with said other bore.

18. The control valve according to claim 10, comprising a stepped bore in said one application means having a shoulder therebetween, abutment means in the larger of said stepped bores and spaced from said shoulder, said other application means including a stepped member, the larger portion of said stepped member being movable in said larger stepped bore between said shoulder and abutment means and the smaller portion of said stepped member being movable through the smaller of said stepped bores for engagement with said valve means, said resilient means including spring means having opposed ends, one of said opposed ends being biased into engagement with said stepped member larger portion urging said stepped member larger portion toward said shoulder, and retainer means in said larger stepped bore and normally urged into displacement preventing engagement with said abutment means, said other opposed end of said spring means being biased into engagement with said retainer means, and said chamber being defined in said larger stepped bore between said shoulder and said stepped member.

19. The control valve according to claim 10, comprising a bore in said one application means, a pair of spaced abutment means in said bore, said other application means being movable in said bore between said abutment means, said chamber being defined in said bore between said one and other application means, retainer means for displacement preventing engagement with one of said abutment means, said resilient means including a spring biased between said retainer means and said other application means, the compressive force of said spring urging said other application means toward the other of said abutment means and urging said retainer means into displacement preventing engagement with said one abutment means, and said chamber being defined in said bore between said one and other application means.

20. The control valve according to claim 10, comprising a fluid pressure source, and selectively operable means for selectively connecting said control port in pressure fluid communication with said source and the atmosphere, said other application means being urged toward its retracted position for concerted applied force movement with said one application means in response to the fluid pressure at said control port in excess of the predetermined value when said selectively operable means connects said control port with said source, and said other application means being relatively movable in response to the force of said resilient means when said selectively operable means connects said control port to the atmosphere.

21. A control valve comprising a housing having inlet and outlet ports therein, valve means controlling pressure fluid communication between said ports, a valve control member movable in said housing for operative engagement with said valve means, said valve control member being movable in response to an applied force to engage and move said valve means toward a position establishing pressure fluid communication between said ports, resiliently urged means movable in said valve control member for operative engagement with said valve means, said resiliently urged means being movable in concert with and relative to said valve control member, and an expansible fluid pressure chamber defined between said valve control member and said resiliently urged means, said resiliently urged means being retractively movable relative to said valve control member toward a retracted position for concerted applied force movement therewith when the fluid pressure in said chamber exceeds the predetermined value and said resiliently urged means being protractively movable relative to said valve control member toward a protracted position to engage and move said valve means toward its position establishing the pressure fluid communication between said ports.

No references cited.

EUGENE G. BOTZ, *Primary Examiner.*